United States Patent [19]
Dardano et al.

[11] 3,895,494
[45] July 22, 1975

[54] GRAVITY FEED, CONTROLLED FLOW RATE PLANT WATERING SYSTEM

[76] Inventors: Frank S. Dardano, 2110 S. Wolcott Ct., Denver, Colo. 80219

[22] Filed: Mar. 19, 1974

[21] Appl. No.: 452,697

[52] U.S. Cl. ........................................ 61/12; 47/38
[51] Int. Cl.² ........................................ E02B 13/00
[58] Field of Search ............ 47/48.5, 38; 61/10, 11, 61/12, 13, 14, 15

[56] References Cited
UNITED STATES PATENTS

| | | | |
|---|---|---|---|
| 994,155 | 6/1911 | Harris | 61/13 |
| 1,078,635 | 11/1913 | Naylor | 61/13 |
| 3,024,614 | 3/1962 | LaRue | 61/15 |
| 3,080,124 | 3/1963 | Rathmann | 61/13 X |
| 3,220,194 | 11/1965 | Lienard | 61/13 |

*Primary Examiner*—Paul R. Gilliam
*Assistant Examiner*—David H. Corbin
*Attorney, Agent, or Firm*—Clarence A. O'Brien and Harvey B. Jacobson

[57] ABSTRACT

An elongated upwardly opening trough including a bottom wall interconnecting the lower marginal portions of a pair of upstanding longitudinal side walls and a pair of upstanding transverse end walls. The opposite ends of the trough include water inlet structure and the bottom wall includes a plurality of longitudinally spaced gravity flow outlet openings formed therein disposed generally along the centerline of the trough. Also, the trough includes upstanding longitudinal partition structure dividing the interior of the trough into separate opposite side compartments. One of the water inlet structures opens into one of the compartments at one end of the trough and the other water inlet structure opens into the other compartment at the other end of the trough. The opposite ends of the partition structure are disposed on opposite sides of the longitudinal centerline of the trough and the partition includes a central portion extending transversely of the trough and crossing the centerline thereof. The gravity flow outlet openings disposed on opposite sides of the partition structure are spaced along the ends of the trough opposite to the ends thereof into which the corresponding water inlet structures open. By admitting water into the ends of the opposite side compartments opposite from the ends water is allowed to drain through the gravity flow outlet openings and by maintaining the water level in the opposite side compartments at least slightly above the bottom wall, substantially equal amounts of water will drain by gravity through the gravity flow outlet openings.

4 Claims, 4 Drawing Figures

GRAVITY FEED, CONTROLLED FLOW RATE PLANT WATERING SYSTEM

BACKGROUND OF THE INVENTION

Heretofore various types of watering systems have been provided for irrigating flower beds, plant and flower boxes and for hydrocultivation purposes. Some of these previous devices are disclosed in U.S. Pat. Nos. 1,983,806, to W. F. Norman, dated Dec. 11, 1934, 2,188,875 to C. Ellis, dated Jan. 30, 1940, 2,896,374 to G. Perin, dated July 28, 1959 and 2,909,328 to G. H. Babyak, dated Oct. 20, 1959. However, most of these previously known devices are reasonably complex in construction and may not be readily adapted for use in "drip wattering" plant and feed troughs. Further, these previously known devices may not be readily transferred from one plant or flower trough or tray to another. Still further, these previously known devices, even if they could be adapted for use in drip watering plant and feed trays, are not constructed in a manner whereby they may be readily leveled for substantially equal gravity flow watering throughout.

BRIEF DESCRIPTION OF THE INVENTION

The watering system of the instant invention has been primarily designed for use in plant and flower troughs and is constructed in a manner whereby substantially even watering of the associated plant or flower tray throughout the length of the watering system may be realized.

Also, the watering system of the instant invention is constructed in a manner whereby it may be readily transferred from one plant or flower tray to another and the watering system is constructed whereby it may be used not only in conjunction with a pressurized water supply but also in conjunction with a gravity flow water supply.

The main object of this invention is to provide a plant and flower tray watering system which will be capable of evenly watering the associated plant or flower tray throughout the extent of the watering system.

Another object of this invention is to provide a watering system which will enable water to be applied to the soil in a plant or flower tray substantially at the level of the soil and below all plant and flower foliage in the tray.

Another important object of this invention is to provide a watering system which may be readily transferred from one plant or flower tray to another.

A further object of this invention is to provide a watering system which may be readily expanded to properly water substantially any number of plant or flower trays.

A final object of this invention is to be specifically enumerated herein is to provide a gravity feed plant watering system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
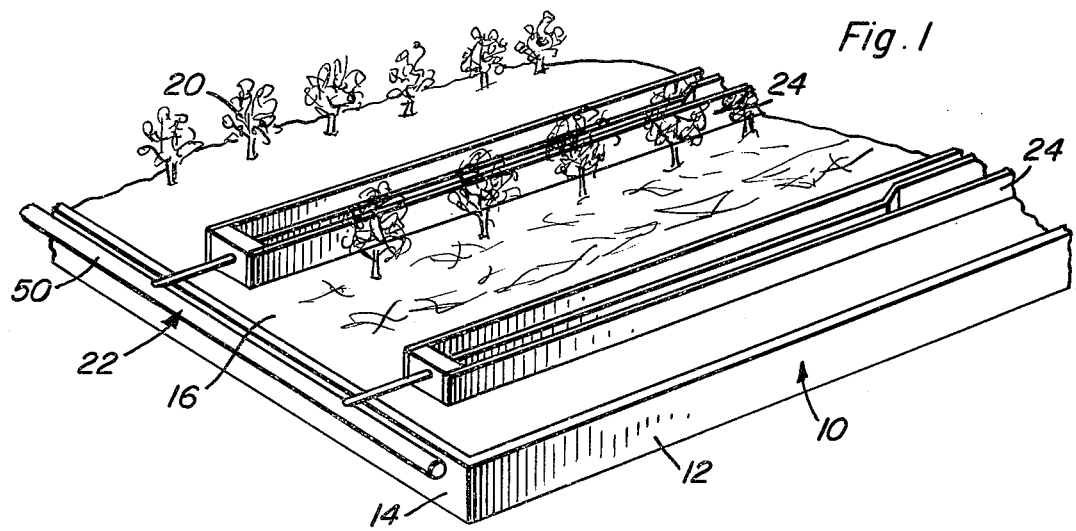
FIG. 1 is a fragmentary perspective view of one corner portion of a plant or flower tray with the watering system of the instant invention operatively associated therewith.

Referring now more specifically to the drawings the numeral 10 generally designates a plant or flower tray including upstanding peripheral sides 12 and 14 as well as additional sides (not shown) interconnected at their lower marginal edge portions by means of a bottom (not shown). The tray 10 has soil or other suitable growing medium 16 disposed therein and contoured to form transversely spaced row hills 18 extending longitudinally of the tray 10, each of the row hills 18 having a plurality of longitudinally spaced plants 20 planted therein.

The watering system of the instant invention is referred to in general by the reference numeral 22 and includes a plurality of elongated upwardly opening troughs 24.

Each trough 24 includes a bottom wall 26 and integral upstanding opposite side walls 28. Block type end walls 30 and 32 are secured in the opposite ends of the troughs 24 with the end walls 30 and 32 snugly received between the corresponding side walls 28 and disposed in substantially fluid-tight sealed engagement with the latter and the corresponding ends of the associated bottom walls 26. Any suitable means such as fasteners or waterproof adhesive may be utilized to secure the end walls 30 and 32 in each trough 24.

Each bottom wall 26 has a plurality of longitudinally spaced openings 36 formed therethrough along a path extending generally along the longitudinal centerline of the trough 24 and each trough 24 additionally includes a longitudinal upstanding partition 38 extending between the corresponding end walls 30 and 32 and dividing the interior of each trough 24 into opposite side trough sections 40 and 42.

Figure 2:
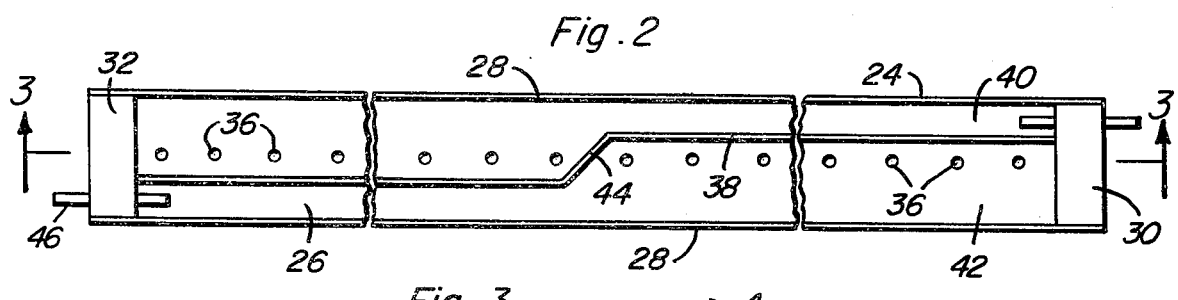
FIG. 2 is an enlarged top plan view of one of the watering troughs of the watering system with parts thereof being broken away.
Figure 3:
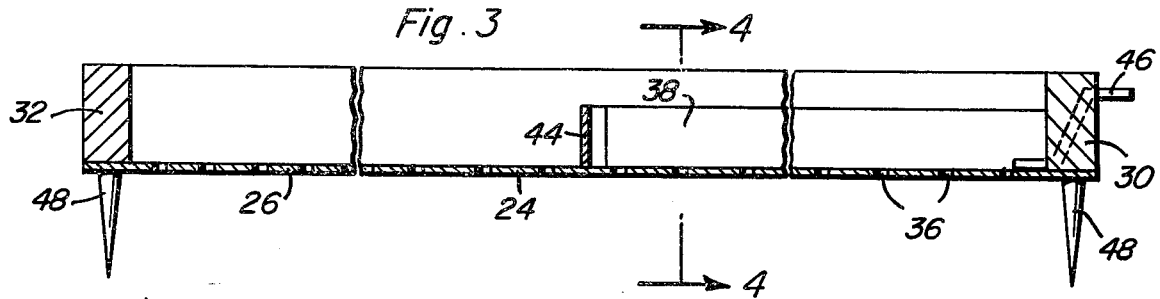
FIG. 3 is a fragmentary longitudinal vertical sectional view taken substantially upon the plane indicated by the section line 3—3 of FIG. 2.
Figure 4:
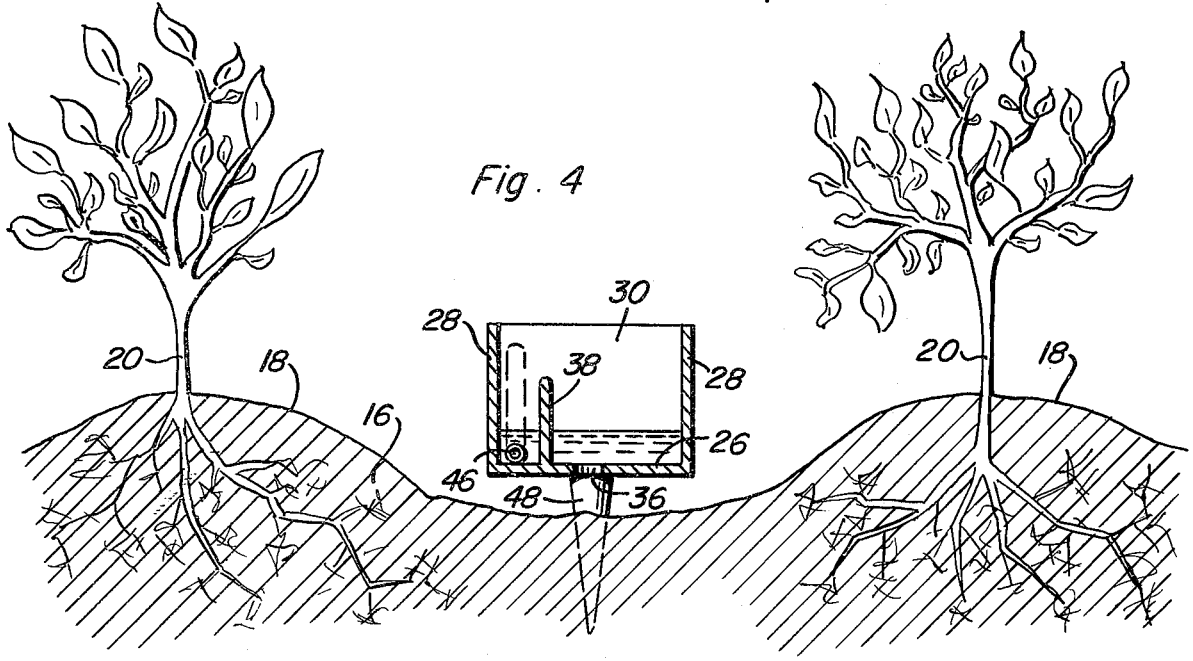
FIG. 4 is a transverse vertical sectional view taken substantially upon the plane indicated by the section line 4—4 of FIG. 3 and with the tray operatively supported from the soil or other growing medium within a plant tray and with the trough centrally positioned between a row of plants in the tray.

It will be noted from FIG. 2 of the drawings that one end of the partition 38 is disposed on one side of the longitudinal centerline of the trough 24 and that the other end of the partition 38 is disposed on the other side of the longitudinal centerline of the trough. Further, the partition 38 includes a central portion 44 which extends transversely of the trough 24 and across the longitudinal centerline thereof. Accordingly, it may be seen that approximately one half of the openings 36 are disposed on one side of the partition 38 while the other half of the openings 36 are disposed on the other side of the partition 38, the openings 36 being disposed in the wider end portions of the corresponding trough sections 40 and 42.

Each of the end walls 30 and 32 has a generally Z-shaped inlet tube 46 secured therethrough with the inlet end of each tube 46 opening outwardly through an upper portion of the corresponding end wall 30 and the outlet end of each tube 46 opening inwardly through a lower portion of the corresponding end wall. Also, the tubes 46 have their outlet ends opening into the narrow ends of the corresponding trough sections 40 and 42 and therefore into the ends of the trough 24 remote from the corresponding outlet openings 36.

Each of the troughs 24 includes a pair of opposite end transversely centered depending support legs 48 and the support legs 48 taper downwardly whereby they may variably penetrate the soil or medium 16 in order to level the corresponding tray 24. The inlet ends of the tubes 46 are communicated with the interior of header pipes 50 and the header pipes 50 may be communicated with any suitable source of water. Such a suitable source of water may comprise a pressurized residential watering system communicated with the header pipes 50 through a manually or time actuated pressure and/or flow controlling valve. Also, the header pipes 50 may be communicated with an elevated source of water under atmospheric pressure through a manually or automatically controlled valve. In operation, when water is supplied to the header pipes 50 water will flow from the header pipes 50 through the tubes 46 into the remote ends of each trough 24. The water flowing into the troughs 24 from the opposite ends thereof will rise in each trough section 40 and 42 thereof, because of the partition 38, in a manner such that a substantially equal flow of water will be gravity discharged through each opening 36 downwardly into the soil or medium 16. In this manner, the plants 20 disposed along the row hills 18 will be evenly watered without the foliage thereof being wetted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gravity feed plant watering system including an elongated upwardly opening trough including a bottom wall, interconnecting a pair of upstanding longitudinal side walls and a pair of upstanding end walls, the opposite ends of said trough including water inlet means and said bottom wall including a plurality of longitudinally spaced gravity flow outlet openings formed therein, said trough including a longitudinal upstanding partition extending between said end walls, spaced intermediate said side walls and sealed relative to said bottom and end walls to divide the interior of said trough into two separate opposite side compartments, said partition including opposite end portions disposed on opposite sides of the longitudinal centerline of said trough and a central portion extending across said centerline and joining said opposite end portions, the outlet openings in one end portion of said trough being disposed on one side of the corresponding end portion of said partition and the outlet openings in the other end portion of said trough being disposed on the other side of the corresponding end portion of said partition, the central portion of said partition crossing the centerline of said trough between adjacent outlet openings, the opposite end portions of said partition being disposed on opposite sides of said centerline, the water inlet means at opposite ends of said trough opening through the corresponding end walls thereof on the sides of the adjacent end portions of said partition remote from the bottom wall outlet openings in those end portions of the trough.

2. The combination of claim 1 wherein said gravity flow outlet openings are disposed generally along said centerline.

3. The combination of claim 1 wherein said trough includes longitudinally spaced depending legs, said legs tapering downwardly for variably penetrating soil in a plant growing tray.

4. The combination of claim 3 including a plurality of said troughs disposed in side-by-side spaced apart relation, and water header pipe means extending between and communicating with said water inlet means.

* * * * *